(12) United States Patent
Lai et al.

(10) Patent No.: US 9,758,844 B2
(45) Date of Patent: Sep. 12, 2017

(54) METHOD FOR RECOVERING RUTHENIUM FROM SPENT RUTHENIUM-BASED CATALYST CARRIED ON ALUMINUM OXIDE

(71) Applicant: Wuhan Kaidi Engineering Technology Research Institute Co., Ltd., Wuhan (CN)

(72) Inventors: Bo Lai, Wuhan (CN); Li Xu, Wuhan (CN); Yiming Han, Wuhan (CN); Qianqian Liu, Wuhan (CN); Dechen Song, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 447 days.

(21) Appl. No.: 14/479,268

(22) Filed: Sep. 5, 2014

(65) Prior Publication Data
US 2014/0373682 A1    Dec. 25, 2014

Related U.S. Application Data

(63) Continuation-in-part of application No. PCT/CN2013/072114, filed on Mar. 4, 2013.

(30) Foreign Application Priority Data

Mar. 5, 2012  (CN) .......................... 2012 1 0055806

(51) Int. Cl.
| | | |
|---|---|---|
| *C22B 11/00* | (2006.01) | |
| *C22B 11/06* | (2006.01) | |
| *C22B 11/02* | (2006.01) | |
| *C22B 3/00* | (2006.01) | |

(52) U.S. Cl.
CPC ............ *C22B 11/06* (2013.01); *C22B 11/026* (2013.01); *C22B 11/048* (2013.01); *Y02P 10/214* (2015.11)

(58) Field of Classification Search
CPC ....... C22B 11/00; C22B 11/06; C22B 11/026; C22B 11/048
USPC ............................................... 423/22; 75/631
See application file for complete search history.

(56) References Cited

U.S. PATENT DOCUMENTS

| | | | |
|---|---|---|---|
| 6,458,183 B1 * | 10/2002 | Phillips | C01G 55/004 75/631 |
| 2008/0287282 A1 * | 11/2008 | Haas | B01J 23/462 502/37 |
| 2008/0293836 A1 * | 11/2008 | Schubert | C01B 7/04 518/715 |
| 2014/0373682 A1 * | 12/2014 | Lai | C22B 11/026 75/631 |

FOREIGN PATENT DOCUMENTS

| | | | |
|---|---|---|---|
| CN | 101797649 | * | 8/2010 |
| CN | 102108444 | * | 6/2011 |
| CN | 102560128 | * | 7/2012 |

* cited by examiner

*Primary Examiner* — Steven Bos
(74) *Attorney, Agent, or Firm* — Matthias Scholl P.C.; Matthias Scholl

(57) ABSTRACT

A method for recovering ruthenium from a spent ruthenium-based catalyst carried on aluminum oxide includes: drying, calcining, and cooling a spent catalyst; grinding the spent catalyst into black powder; placing the black powder in a fluidized bed reactor, purging the reactor with hydrogen and heating the black powder to obtain ruthenium metal, then heating the black powder in a mixed atmosphere of oxygen and ozone to obtain $RuO_4$ gas; absorbing the $RuO_4$ gas with a sufficient amount of hydrochloric acid to obtain a $H_3RuCl_6$ solution; adding an excess oxidant to the $H_3RuCl_6$ solution to oxidize the $H_3RuCl_6$ into $H_2RuCl_6$; adding excess $NH_4Cl$ to the $H_2RuCl_6$ and then filtering, and washing the filter cake to obtain solid $(NH_4)_2RuCl_6$; and reducing the solid $(NH_4)_2RuCl_6$ by hydrogen to obtain ruthenium metal.

16 Claims, No Drawings

METHOD FOR RECOVERING RUTHENIUM FROM SPENT RUTHENIUM-BASED CATALYST CARRIED ON ALUMINUM OXIDE

CROSS-REFERENCE TO RELATED APPLICATIONS

This application is a continuation-in-part of International Patent Application No. PCT/CN2013/072114 with an international filing date of Mar. 4, 2013, designating the United States, now pending, and further claims priority benefits to Chinese Patent Application No. 201210055806.1 filed Mar. 5, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a method for recovering ruthenium from a spent ruthenium-based catalyst carried on aluminum oxide.

Description of the Related Art

Ruthenium is an expensive rare metal and has excellent catalytic performance and widespread application in catalyst industry. Ruthenium is often used in synthesizing ammonia, preparing cyclohexene through selective hydrogenation of benzene, and manufacturing fuel cells. Recovering ruthenium from a spent catalyst is a possible solution for recycling of the ruthenium resources.

One known method of recovering ruthenium includes the steps of: calcining a ruthenium catalyst carried on activated carbon at 600-1000° C. for 2-20 hours to obtain a grey black mixture; mixing the grey black mixture with KOH and $KNO_3$, heating them at 300-950° C. for 1-5 hours, and cooling them to obtain an alkali fusion product; dissolving the alkali fusion product in water at 50-90° C. to obtain a $K_2RuO_4$ solution; adding NaClO and concentrated $H_2SO_4$ to the $K_2RuO_4$ solution and heating the mixture solution at 50-90° C. for 2-4 hours to obtain $RuO_4$ gas; and using a strong acid solution to absorb the $RuO_4$ gas and then distilling to obtain a ruthenium salt. The method is complicated and has high energy consumption and low recovery rate of ruthenium.

In addition, another method of preparing ruthenium powder includes: adding ammonium chloride to a hydrochloric acid solution containing ruthenium (III) to produce $(NH_4)_3RuCl_6$ precipitate, calcining the $(NH_4)_3RuCl_6$ in a hydrogen atmosphere to produce ruthenium powder. This method is capable of producing high quality ruthenium powder. However, because $(NH_4)_3RuCl_6$ is highly water-soluble, the ruthenium cannot be completely precipitated from the solution and, therefore, the recovery rate of ruthenium is very low.

SUMMARY OF THE INVENTION

In view of the above-described problems, it is one objective of the invention to provide a simple, low-cost method for recovering ruthenium from a spent ruthenium-based catalyst carried on aluminum oxide at a high recovery rate.

To achieve the above objective, in accordance with one embodiment of the invention, there is provided a method for recovering ruthenium from a spent ruthenium-based catalyst carried on aluminum oxide, the method comprising:

1) drying a spent ruthenium-based catalyst carried on aluminum oxide at 100-150° C. in a nitrogen atmosphere for 1-2 hours, calcining the spent ruthenium-based catalyst carried on aluminum oxide at 300-500° C. for 2-4 hours, cooling the spent ruthenium-based catalyst carried on aluminum oxide to room temperature, and grinding the spent ruthenium-based catalyst carried on aluminum oxide into black powder comprising ruthenium oxide;

2) transferring the black powder to a fluidized bed reactor, purging the fluidized bed reactor with nitrogen for 20-40 minutes and then heating the black powder in a hydrogen atmosphere at a temperature of 200-400° C. and a pressure of 1-2 MPa for 2-3 hours to obtain a powder comprising ruthenium;

3) purging the fluidized bed reactor with nitrogen for 20-40 minutes, and then heating the powder comprising ruthenium in a mixed gas of oxygen and ozone at a temperature of 500-750° C. and a pressure of 1-2 MPa for 1-8 hours to obtain a $RuO_4$ gas;

4) absorbing the $RuO_4$ gas with a sufficient amount of 3-8 mol/L hydrochloric acid to obtain a $H_3RuCl_6$ solution;

5) adding an excess oxidant to the $H_3RuCl_6$ solution and stirring for 0.5-1.5 hours to completely oxidize the $H_3RuCl_6$ into $H_2RuCl_6$, adding excess $NH_4Cl$ to the $H_2RuCl_6$ solution, stirring the $H_2RuCl_6$ solution at 60-90° C. for 1-3 hours, filtering to obtain a filter cake, and washing the filter cake to obtain solid $(NH_4)_2RuCl_6$; the oxidant used is a soluble chlorate; and 6) reducing the solid $(NH_4)_2RuCl_6$ at a temperature of 450-800° C. in a mixed atmosphere of hydrogen and nitrogen to obtain ruthenium; a volume fraction of the hydrogen in the mixed atmosphere of hydrogen and nitrogen is 1-15%.

In a class of this embodiment, in step 3), the space velocity of the mixed gas of oxygen and ozone is 1000-4000 $h^{-1}$.

In a class of this embodiment, in step 3), the volume fraction of the ozone in the mixed gas of oxygen and ozone is 1-20%.

In a class of this embodiment, in step 4), the concentration of the hydrochloric acid is 6 mol/L.

In a class of this embodiment, in step 5), the weight of the $NH_4Cl$ is 1.2-2.5 times the theoretical weight of the $NH_4Cl$ that is required to completely react with the $H_2RuCl_6$ solution.

In a class of this embodiment, in step 5), the oxidant is one or more of the following chlorates: ammonium chlorate, potassium chlorate, sodium chlorate, and magnesium chlorate.

In a class of this embodiment, in step 5), the filter cake is washed with an ethanol solution.

In a class of this embodiment, in step 5), after adding excess $NH_4Cl$ to the $H_2RuCl_6$ solution, the $H_2RuCl_6$ solution is stirred at 100-400 revolutions per minute for 1-3 hours. Furthermore, it is preferred that the $H_2RuCl_6$ solution is stirred at 200 revolutions per minute for 1.5-2.5 hours.

The reactions and purposes of each step of the method for recovering ruthenium from a spent ruthenium-based catalyst carried on aluminum oxide are described below:

In step 1), through drying and calcining at a high temperature, water and organic residue in the spent catalyst are removed. The obtained product mainly contains ruthenium oxide.

In step 2), the ruthenium oxide in the spent catalyst is reduced into ruthenium in the free state according to the following chemical reaction:

$$RuO_2 + 2H_2 \rightarrow Ru + 2H_2O.$$

In step 3), $RuO_4$ is produced according to the following chemical reactions:

$$Ru + 2O_2 \rightarrow RuO_4\uparrow; \text{ and}$$

$$3Ru + 4O_3 \rightarrow 3RuO_4\uparrow.$$

In addition, the mixed gas may be replaced by air or pure oxygen.

In step 4), the $RuO_4$ gas is injected into a sufficient amount of 3-8 mol/L hydrochloric acid, and is then completely absorbed and reduced to produce a $H_3RuCl_6$ solution, according to the following chemical reaction:

$$2RuO_4 + 22HCl \rightarrow 2H_3RuCl_6 + 8H_2O + 5Cl_2\uparrow.$$

In step 5), the $H_3RuCl_6$ is oxidized into $H_2RuCl_6$, and then reacted with excess ammonium chloride to obtain an $(NH_4)_2RuCl_6$ precipitate, according to the following chemical reactions:

$$6RuCl_6^{3-} + ClO_3^- + 6H^+ \rightarrow 6RuCl_6^{2-} + Cl^- + 3H_2O; \text{ and}$$

$$RuCl_6^{2-} + 2NH_4^+ \rightarrow (NH_4)_2RuCl_6\downarrow.$$

In step 5), in order to completely precipitate ruthenium, excess ammonium chloride is added. Preferably, in order to increase the recovery rate, the weight of the $NH_4Cl$ is 1.2-2.5 times of the theoretical weight of the $NH_4Cl$ that is required to completely react with the $H_2RuCl_6$ solution. However, when excess ammonium chloride is added, unreacted ammonium chloride may crystallize. In order to completely precipitate the $H_2RuCl_6$ and to reduce the water content of the precipitate, the quantity of the ammonium chloride needs to be controlled, and it is necessary to stir the $H_2RuCl_6$ solution at 100-400 revolutions per minute for 1-3 hours when adding the ammonium chloride.

In step 6), the solid $(NH_4)_2RuCl_6$ is reduced by hydrogen at a high temperature to obtain ruthenium metal. By further treatment, the ruthenium metal is converted into ruthenium powder.

Compared with the conventional "alkali fusion-oxidizing distillation" method, the method described herein has a high recovery rate of ruthenium. In addition, the $(NH_4)_2RuCl_6$ precipitate can be directly used to prepare ruthenium powder through calcination in a hydrogen atmosphere at a high temperature. The method described herein is a simple, economic method and has low energy consumption.

DETAILED DESCRIPTION OF THE EMBODIMENTS

The invention is explained in further detail below. It should be noted that the following examples are intended to describe and not to limit the invention.

Example 1

1) 90 g of spent ruthenium-based catalyst carried on aluminum oxide which contains by weight 5% ruthenium was placed in a crucible. The crucible was transferred to a muffle furnace. The muffle furnace was purged with nitrogen. After that, the spent ruthenium-based catalyst carried on aluminum oxide was dried at 100-150° C. in the nitrogen atmosphere for 1-2 hours, then calcined at 300-500° C. for 2-4 hours to remove the organic residue in the spent catalyst. Then, the muffle furnace was cooled down to room temperature to obtain 81.2 g of black solid, and the black solid was ground into powder.

2) 60 g of the obtained black powder was transferred to a fluidized bed reactor. The fluidized bed reactor was purged with nitrogen for 30 minutes. Next, the black powder was heated in a hydrogen atmosphere at 300° C. and a pressure of 1.0 MPa for 2 hours so that the ruthenium oxide in the spent catalyst was reduced into ruthenium metal.

3) The fluidized bed reactor was purged with nitrogen again for 20 minutes. Next, the spent catalyst was heated in a mixed atmosphere of oxygen and ozone containing ozone at a volume fraction of 20% at a temperature of 600-650° C., a pressure of 1 MPa, and a space velocity of 1200 $h^{-1}$ for 4 hours to obtain $RuO_4$ gas.

4) the $RuO_4$ gas was absorbed by 6 mol/L hydrochloric acid under stirring to obtain a $H_3RuCl_6$ solution;

5) 0.63 g of $NaClO_3$ powder (1.2 times the stoichiometric amount of 0.525 g $NaClO_3$ required for complete reaction) was added to the $H_3RuCl_6$ solution and stirred for 0.5 hour to completely oxidize $H_3RuCl_6$ into $H_2RuCl_6$. Then, 3.81 g of $NH_4Cl$ (1.2 times the stoichiometric amount of 3.18 g $NH_4Cl$ required for complete reaction) was added to the $H_2RuCl_6$ solution, and then heated at 90° C. under stirring at 200 revolutions per minute for 1.5 hours to obtain a $(NH_4)_2RuCl_6$ precipitate. The reaction product was filtered and the obtained filter cake was washed with an ethanol solution to remove the impurities and the hydrochloric acid in the filter cake. The filter cake was then dried to obtain solid $(NH_4)_2RuCl_6$; and 6) The solid $(NH_4)_2RuCl_6$ was heated at 650° C. in a mixed atmosphere of hydrogen and nitrogen which contains hydrogen at a volume fraction of 5% to obtain 2.941 g of ruthenium metal.

In Example 1, the recovery rate of ruthenium was 98.03%.

Example 2

The process of step 1) of Example 2 was identical to that of Example 1.

In step 2), 60 g of the black powder obtained in 1) was transferred to a fluidized bed reactor. The fluidized bed reactor was purged with nitrogen for 20 minutes. Next, the black powder was heated in a hydrogen atmosphere at 200° C. and a pressure of 1.5 MPa for 3 hours so that the ruthenium oxide in the spent catalyst was reduced into ruthenium metal.

In step 3), the fluidized bed reactor was purged with nitrogen again for 30 minutes. Next, the spent catalyst was heated in a mixed atmosphere of oxygen and ozone containing ozone at a volume fraction of 10% at a temperature of 600° C., a pressure of 1.5 MPa, and a space velocity of 3000 $h^{-1}$ for 4 hours to obtain $RuO_4$ gas.

In step 4), the $RuO_4$ gas was absorbed by 3 mol/L hydrochloric acid under stirring to obtain a $H_3RuCl_6$ solution;

In step 5), 0.72 g of $KClO_3$ powder (1.2 times the stoichiometric amount of $KClO_3$ required for complete reaction) was added to the $H_3RuCl_6$ solution and stirred for 1 hour to completely oxidize $H_3RuCl_6$ into $H_2RuCl_6$. Then, 4.77 g of $NH_4Cl$ (1.5 times the stoichiometric amount of $NH_4Cl$ required for complete reaction) was added to the $H_2RuCl_6$ solution, and then heated at 80° C. under stirring at 200 revolutions per minute for 1.5 hours to obtain a $(NH_4)_2RuCl_6$ precipitate. The reaction product was filtered and the obtained filter cake was washed with an ethanol solution to remove the impurities and the hydrochloric acid in the filter cake. The filter cake was then dried to obtain solid $(NH_4)_2RuCl_6$; and In step 6), the solid $(NH_4)_2RuCl_6$ was heated at 800° C. in a mixed atmosphere of hydrogen and nitrogen which contains hydrogen at a volume fraction of 10% to obtain 2.976 g of ruthenium metal.

In Example 2, the recovery rate of the ruthenium was 99.2%.

Example 3

The process of step 1) of Example 3 was identical to that of Example 1.

In step 2), 60 g of the black powder obtained in 1) was transferred to a fluidized bed reactor. The fluidized bed reactor was purged with nitrogen for 40 minutes. Next, the black powder was heated in a hydrogen atmosphere at 400° C. and a pressure of 2 MPa for 2.5 hours so that the ruthenium oxide in the spent catalyst was reduced into ruthenium metal.

In step 3), the fluidized bed reactor was purged with nitrogen again for 40 minutes. Next, the spent catalyst was heated in a mixed atmosphere of oxygen and ozone containing ozone at a volume fraction of 15% at a temperature of 650° C., a pressure of 2 MPa, and a space velocity of 4000 $h^{-1}$ for 5 hours to obtain $RuO_4$ gas.

In step 4), the $RuO_4$ gas was absorbed by 5 mol/L hydrochloric acid under stirring to obtain a $H_3RuCl_6$ solution;

In step 5), 1.13 g of $Mg(ClO_3)_2$ powder (1.2 times the stoichiometric amount required for complete reaction) was added to the $H_3RuCl_6$ solution and stirred for 1.5 hours to completely oxidize $H_3RuCl_6$ into $H_2RuCl_6$. Then, 6.36 g of $NH_4Cl$ (twice the stoichiometric amount required for complete reaction) was added to the $H_2RuCl_6$ solution, and then heated at 90° C. under stirring at 100 revolutions per minute for 2.5 hours to obtain a $(NH_4)_2RuCl_6$ precipitate. The reaction product was filtered and the obtained filter cake was washed with an ethanol solution to remove the impurities and the hydrochloric acid in the filter cake. The filter cake was then dried to obtain solid $(NH_4)_2RuCl_6$; and In step 6), the solid $(NH_4)_2RuCl_6$ was heated at 650° C. in a mixed atmosphere of hydrogen and nitrogen which contains hydrogen at a volume fraction of 15% to obtain 2.946 g of ruthenium metal.

In Example 3, the recovery rate of the ruthenium was 98.2%.

Example 4

The process of step 1) of Example 4 was identical to that of Example 1.

In step 2), 60 g of the black powder obtained in 1) was transferred to a fluidized bed reactor. The fluidized bed reactor was purged with nitrogen for 25 minutes. Next, the black powder was heated in a hydrogen atmosphere at 350° C. and a pressure of 2 MPa for 3 hours so that the ruthenium oxide in the spent catalyst was reduced into ruthenium metal.

In step 3), the fluidized bed reactor was purged with nitrogen again for 35 minutes. Next, the spent catalyst was heated in a mixed atmosphere of oxygen and ozone containing ozone at a volume fraction of 5% at a temperature of 600° C., a pressure of 2 MPa, and a space velocity of 4000 $h^{-1}$ for 6 hours to obtain $RuO_4$ gas.

In step 4), the $RuO_4$ gas was absorbed by 6 mol/L hydrochloric acid under stirring to obtain a $H_3RuCl_6$ solution;

In step 5), 0.63 g of $NaClO_3$ powder (1.2 times the stoichiometric amount required for complete reaction) was added to the $H_3RuCl_6$ solution and stirred for 1.5 hours to completely oxidize $H_3RuCl_6$ into $H_2RuCl_6$. Then, 7.94 g of $NH_4Cl$ (2.5 times the stoichiometric amount required for complete reaction) was added to the $H_2RuCl_6$ solution, and then heated at 70° C. under stirring at 400 revolutions per minute for 1 hour to obtain a $(NH_4)_2RuCl_6$ precipitate. The reaction product was filtered and the obtained filter cake was washed with an ethanol solution to remove the impurities and the hydrochloric acid in the filter cake. The filter cake was then dried to obtain solid $(NH_4)_2RuCl_6$; and In step 6), the solid $(NH_4)_2RuCl_6$ was heated at 800° C. in a mixed atmosphere of hydrogen and nitrogen which contains hydrogen at a volume fraction of 15% to obtain 2.901 g of ruthenium metal.

In Example 4, the recovery rate of the ruthenium was 96.7%.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for recovering ruthenium from a spent ruthenium-based catalyst carried on aluminum oxide, the method comprising:
1) drying a spent ruthenium-based catalyst carried on aluminum oxide at 100-150° C. in a nitrogen atmosphere for 1-2 hours, calcining the spent ruthenium-based catalyst carried on aluminum oxide at 300-500° C. for 2-4 hours, cooling the spent ruthenium-based catalyst carried on aluminum oxide to room temperature, and grinding the spent ruthenium-based catalyst carried on aluminum oxide into a black powder;
2) transferring the black powder to a fluidized bed reactor, purging the fluidized bed reactor with nitrogen for 20-40 minutes and then purging the fluidized bed reactor with hydrogen, and heating the black powder in a hydrogen atmosphere at a temperature of 200-400° C. and a pressure of 1-2 MPa for 2-3 hours to obtain a powder comprising ruthenium;
3) purging the fluidized bed reactor with nitrogen for 20-40 minutes, and then heating the powder comprising ruthenium in a mixed atmosphere of oxygen and ozone at a temperature of 500-750° C. and a pressure of 1-2 MPa for 1-8 hours to obtain a $RuO_4$ gas;
4) absorbing the $RuO_4$ gas with 3-8 mol/L hydrochloric acid to obtain a $H_3RuCl_6$ solution;
5) adding an excess oxidant to the $H_3RuCl_6$ solution, stirring the $H_3RuCl_6$ solution for 0.5-1.5 hours to completely oxidize $H_3RuCl_6$ into $H_2RuCl_6$ to obtain a $H_2RuCl_6$ solution, adding excess $NH_4Cl$ to the $H_2RuCl_6$ solution and stirring at 60-90° C. for 1-3 hours to obtain a mixture, filtering the mixture to obtain a filter cake, and washing the filter cake to obtain solid $(NH_4)_2RuCl_6$, wherein the oxidant is a soluble chlorate; and
6) reducing the solid $(NH_4)_2RuCl_6$ at a temperature of 450-800° C. in a mixed atmosphere of hydrogen and nitrogen to obtain ruthenium, wherein a volume fraction of hydrogen in the mixed atmosphere of hydrogen and nitrogen is 1-15%.

2. The method of claim 1, wherein in 3), a space velocity of the mixed atmosphere of oxygen and ozone is 1000-4000 $h^{-1}$.

3. The method of claim 1, wherein in 3), a volume fraction of the ozone in the mixed atmosphere of oxygen and ozone is 1-20%.

4. The method of claim 1, wherein in 4), a concentration of the hydrochloric acid is 6 mol/L.

5. The method of claim 1, wherein in 5), 1.2-2.5 times the theoretical weight of the $NH_4Cl$ that is required to completely react with the $H_2RuCl_6$ solution is added to the $H_2RuCl_6$ solution.

6. The method of claim 1, wherein in 5), the oxidant is selected from the group consisting of ammonium chlorate, potassium chlorate, sodium chlorate, and magnesium chlorate.

7. The method of claim 1, wherein in 5), the filter cake is washed with an ethanol solution.

8. The method of claim 1, wherein in 5), the $H_2RuCl_6$ solution is stirred at 100-400 revolutions per minute for 1-3 hours.

9. The method of claim 8, wherein in 5), the $H_2RuCl_6$ solution is stirred at 200 revolutions per minute for 1.5-2.5 hours.

10. The method of claim 2, wherein in 3), a volume fraction of the ozone in the mixed atmosphere of oxygen and ozone is 1-20%.

11. The method of claim 2, wherein in 4), a concentration of the hydrochloric acid is 6 mol/L.

12. The method of claim 2, wherein in 5), 1.2-2.5 times the theoretical weight of the $NH_4Cl$ that is required to completely react with the $H_2RuCl_6$ solution is added to the $H_2RuCl_6$ solution.

13. The method of claim 2, wherein in 5), the oxidant is selected from the group consisting of ammonium chlorate, potassium chlorate, sodium chlorate, and magnesium chlorate.

14. The method of claim 2, wherein in 5), the filter cake is washed with an ethanol solution.

15. The method of claim 2, wherein in 5), the $H_2RuCl_6$ solution is stirred at 100-400 revolutions per minute for 1-3 hours.

16. The method of claim 15, wherein in 5), the $H_2RuCl_6$ solution is stirred at 200 revolutions per minute for 1.5-2.5 hours.

* * * * *